K. IBUSUKI.
AUTO ENGINE VALVE SPRING TOOL.
APPLICATION FILED MAY 24, 1918.
1,324,052.  
Patented Dec. 9, 1919.
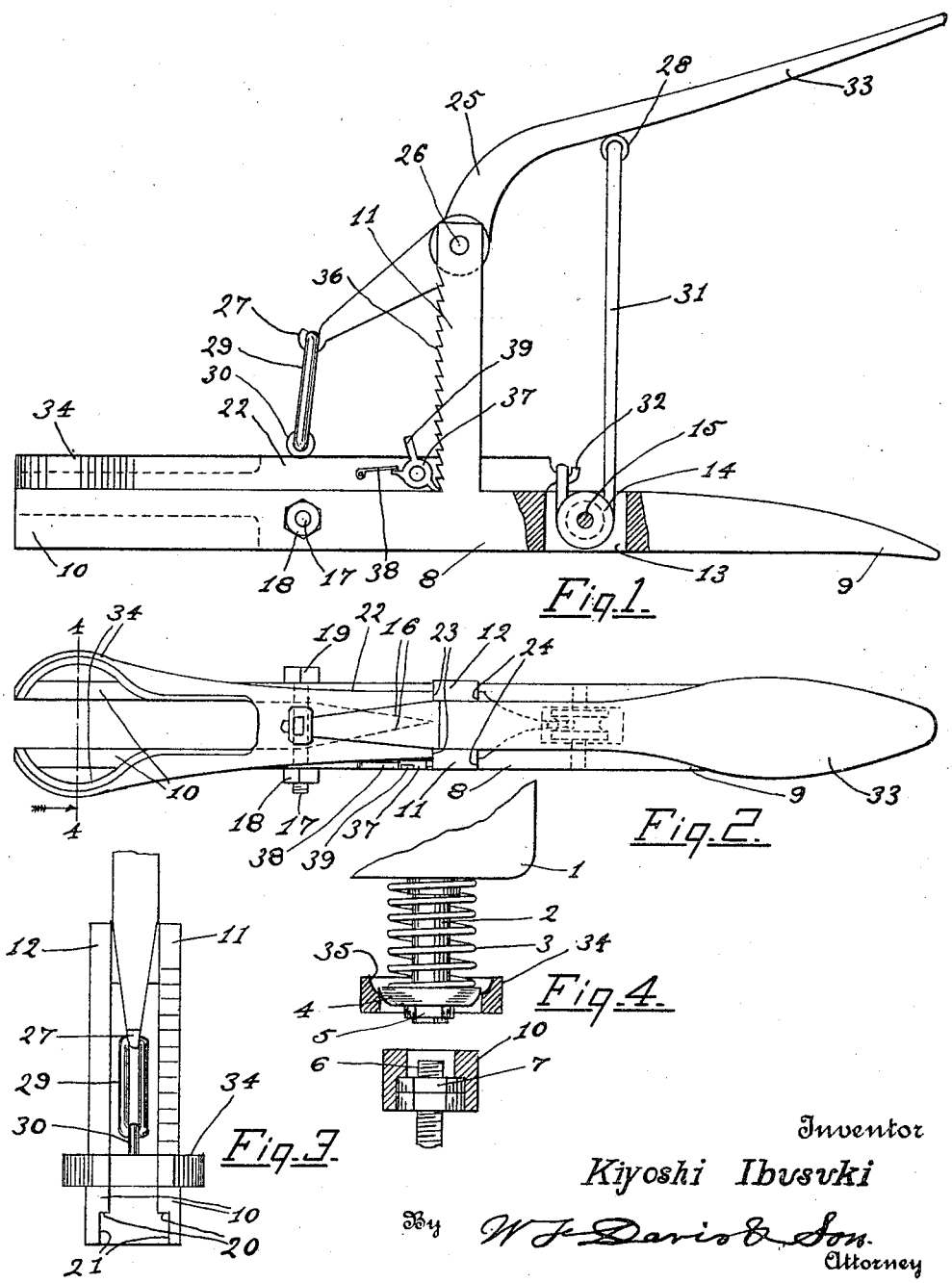
Inventor  
Kiyoshi Ibusuki  
By W. F. Davis & Son.  
Attorney

UNITED STATES PATENT OFFICE.

KIYOSHI IBUSUKI, OF KANSAS CITY, MISSOURI.

AUTO-ENGINE-VALVE-SPRING TOOL.

1,324,052. Specification of Letters Patent. Patented Dec. 9, 1919.

Application filed May 24, 1918. Serial No. 236,320.

*To all whom it may concern:*

Be it known that I, KIYOSHI IBUSUKI, a subject of the Emperor of Japan, residing at Kansas City, in the county of Jackson and State of Missouri, have invented certain new and useful Improvements in Auto-Engine-Valve-Spring Tools, of which the following is a full, clear, and exact description, such as will enable others skilled in the art to which it appertains to make and use the same.

The invention relates to automobile tools and more particularly to a valve spring compressing tool which may be applied directly to the valve spring of the automobile engine to lift the spring from the valve stem connection so that the latter may be placed and secured to the stem or removed therefrom.

The admitting and exhaust valves of the usual automobile explosive engine are placed in the combustion chamber with the valve stems protruding from the chamber, the stems being held in a direction away from the chamber to seat the valves, the latter being accomplished by coiled compression springs surrounding the stems and bearing in one direction against the combustion, or valve chamber according to the construction of the particular engine, and in the other direction against a collar around the stem and held in place thereon by a nut and cotter pin, or two nuts and a cotter pin, and in some instance two nuts, or a pin without a nut all the foregoing being common and well known construction.

To compress these valve springs and place or remove the collars, nuts, pins and the like as the case may be is a very difficult operation owing to the difficulty in holding the spring sufficiently compressed to allow work on the stem connecting means whether the latter be collars, nuts, or pins. It is essential that a simple and efficient tool be provided to compress the springs in a direction toward the combustion or valve chamber so that the outer end of the valve stem will be free to receive the collar, the nut, or the pin, and so that the collar, the nut, or the pin may be removed from the valve stem when it is desired to remove the valve from the combustion or valve chamber, or when it is desired to regrind the valve, and for any purpose that may occur.

The present invention has provided a simple and efficient tool for compressing the valve springs of automobile and other internal combustion engines, so that the spring connections to the stem may be placed upon and secured to the stem, and removed from the stem.

With these and other objects in view, the invention consists in the features of construction, combinations, and arrangements of parts hereinafter set forth and more particularly pointed out in the appended claims, the accompanying drawings illustrating a form of the improved tool for compressing the valve springs of automobile and other internal combustion engines.

In the drawings:

Figure 1, is a view in side elevation of the improved valve compressing tool for compressing the valve springs of automobile and other internal combustion engines, with a portion broken away to show certain interior parts.

Fig. 2, is a plan view of the tool.

Fig. 3, is a view in end elevation.

Fig. 4, is a fragmentary sectional view taken on line 4—4 of Fig. 2 and a fragmentary view of certain parts of an internal combustion engine to show the application of the tool.

From the combustion or valve chamber 1 projects the valve stem 2 with the coiled spring 3 surrounding the stem and resting on the collar 4 the latter being held in position by the nut 5, while the valve tappet 6 is positioned away from the stem representing a certain relative operating position, the nut 7 being shown on the tappet, all of which is common and well known construction and illustrated merely to show the application of the improved valve spring compressing tool, it being understood that the construction of internal combustion engines vary and that the construction shown is only one of the ordinary types.

The member 8 is provided with the handle 9, the jaws 10, the projecting bars 11 and 12, and the rectangular hole 13 in which is inserted the pulley 14, the latter being journaled on the pin 15 which passes through the member.

The bifurcated jaws 10 are divided along the dotted lines 16 and the bolt 17 and nut 18 are provided to adjust the distance between the jaws, the latter being resilient and in spring tension against the nut 18 and the head 19 of the bolt.

The jaws 10 are provided with the shoulders 20 to rest upon the nut 7 of the tappet rod 6, the inner walls 21 of the jaws retaining the shoulders upon the nut and preventing slippage therefrom.

The member 22 formed to rest between the projecting bars 11 and 12 and slide to and fro easily therebetween, the shoulders 23 and 24 on opposite sides of the bars preventing the member from displacement or slippage endwise.

The lever 25 is pivoted between the bars 11 and 12 by the pin 26 and provided with the hook 27 and eye bolt 28, the connecting link 29 pivotally connecting from the hook to the eye bolt 30, the latter being secured in the member 22, while the flexible connecting member 31 of any suitable material as cord or chain connects from the eye bolt 28 to the hook 32 formed on the member 22, the connecting member passing around the pulley 14, so that when the handle 33 of the lever 25 is pressed toward the member 8, the member 22 acts as a cantaliver and is drawn away from the member 8 by the connecting link 29, the connecting member 31 holding the member 22 parallel with the member 8.

The bifurcated jaws 34 of the member 22 are curved as shown and beveled inwardly at 35 so that they will engage the collar 4 as shown, it being understood that the jaws will engage various collars without changing the dimensions of the jaws. This is very advantageous for the reason that it enables one tool to fit and serve nearly if not quite all sizes and makes of automobile engines.

The projecting bar 11 is provided with the ratchet teeth 36 which are engaged by the ratchet catch 37, the latter being held in engageable position by the spring 38 so that when the member 22 is drawn from the member 8 this catch will retain the members in any desired separated position, the handle 39 being provided integral with the catch for the purpose of disengaging the latter from the ratchet teeth 36 when it is desired to close the members 8 and 22 to the position shown in Fig. 1.

The distance from the center of the pivotal connection of the link 29 to the center of the pivot pin 26, is approximately the same as the distance from the latter to the center of the connection of the flexible member 31 to the eye bolt 28, and these three positions are approximately in alinement so that the member will be retained in a parallel position with the member 8. It is necessary however to exert a slight force on the jaws 34 in the direction of the jaws 10 in order to maintain the flexible member 31 taut when working the handle 33 of the lever 25 to and fro to draw the member 22 from the member 8 or close it toward the latter.

In application the tool is applied as shown in Fig. 4, it being understood that when the tool is in this position it is no longer necessary to press the jaws 34 toward the jaws 10 as the springs 3 will supply sufficient resistance when the members 22 and 8 are spread to a greater distance. When the jaws are in this position it is only necessary to press the handle 33 toward the member 8 until the collar 4 is pressed the desired distance away from the valve tappet, 6, the ratchet catch 37 engaging the ratchet teeth 36 and maintaining the members 8 and 22 in spread position and the collar 4 removed from operative position so that any desired connection can be applied to or removed from the valve stem 2.

When it is desired to disengage the tool it is only necessary to disengage the latch 37 by moving the handle 39 from the bar 11. It is obvious that the improved tool may be applied to the spring above the collar 4 if desired.

What I claim as new, and desire to secure by Letters Patent, is:—

1. In a tool for compressing the valve springs of an internal combustion engine, a main member with one end thereof forming a bifurcated jaw, the opposite end of said member forming a handle, a pair of bars projecting at an approximately right angle from said member and positioned intermediate said jaws and handle, a secondary member paralleling said main member and fitting loosely between said bars, one end of said secondary member forming a bifurcated jaw and positioned adjacent the bifurcated jaw of the main member, the opposite end of said secondary member forming a hook, a lever pivoted to said bars, pivoted connections from said lever to said secondary member intermediate said bifurcated jaw and said bars, a pulley pivoted in said main member intermediate said bars and the handle end of said main member, and a flexible connection from said lever around said pulley and attached to said hook.

2. In a valve spring tool for internal combustion engines, a main member provided with a bifurcated jaw at one end and a handle at the opposite end of said member, bars extending laterally from said main member and positioned intermediate said jaw and said handle, a pulley pivoted within said main member intermediate said bars and the handle end of said member, a secondary member mounted between said bars and paralleling said main member from adjacent said pulley to adjacent the jaw end of said main member, a bifurcated jaw integral with said secondary member and approximately parallel with the bifurcated jaw of said member, a lever pivoted to said bars, a pivotal connection from said lever to said secondary member intermediate said bars and said jaws, and a flexible connection connecting to said lever and leading around said pulley and connecting to the corresponding end of said secondary member.

3. A valve spring tool for internal combustion engines comprising, a tool provided with a pair of bifurcated jaws positioned approximately parallel, a pair of handles at the opposite end of said tool, connections connecting one of said handles to one of said jaws, said connections including a pulley and a flexible member leading around said pulley, and said connections so connected that by pressing one of said handles toward the remaining handle one of said jaws is drawn away from the remaining handle and maintained in approximately parallel relations therewith.

KIYOSHI IBUSUKI.